Nov. 20, 1951  H. H. SEMROW  2,575,843
SOAP DISH
Filed March 14, 1946  2 SHEETS—SHEET 1
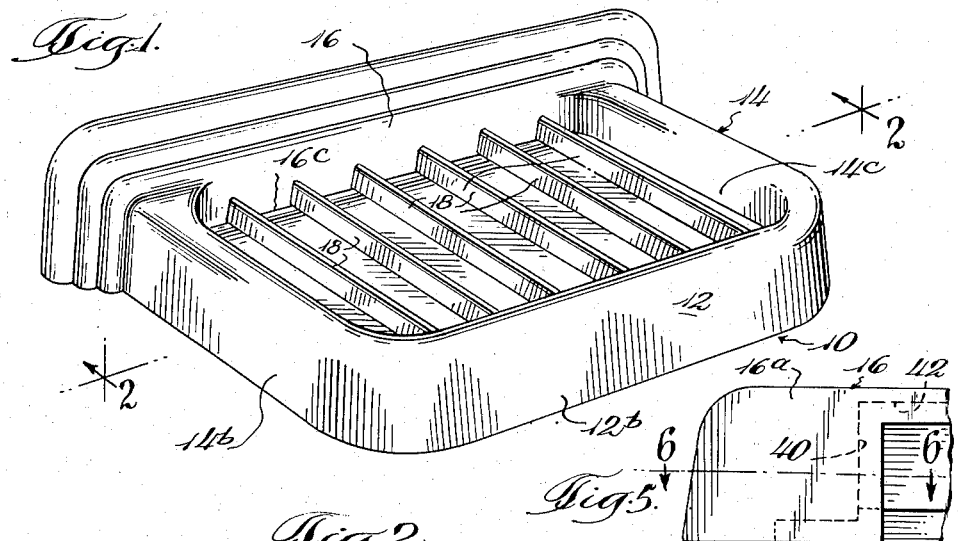
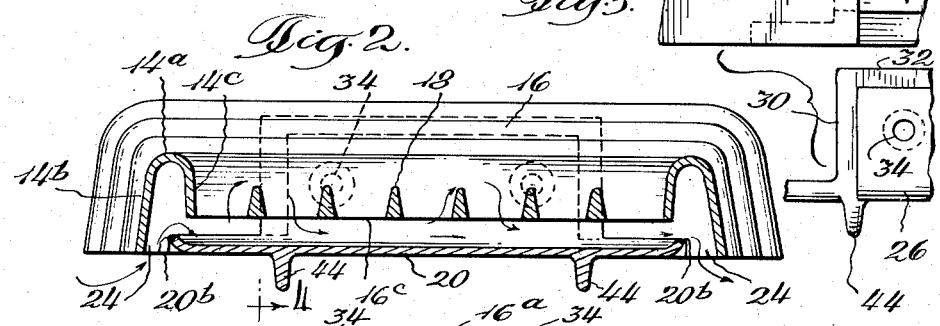
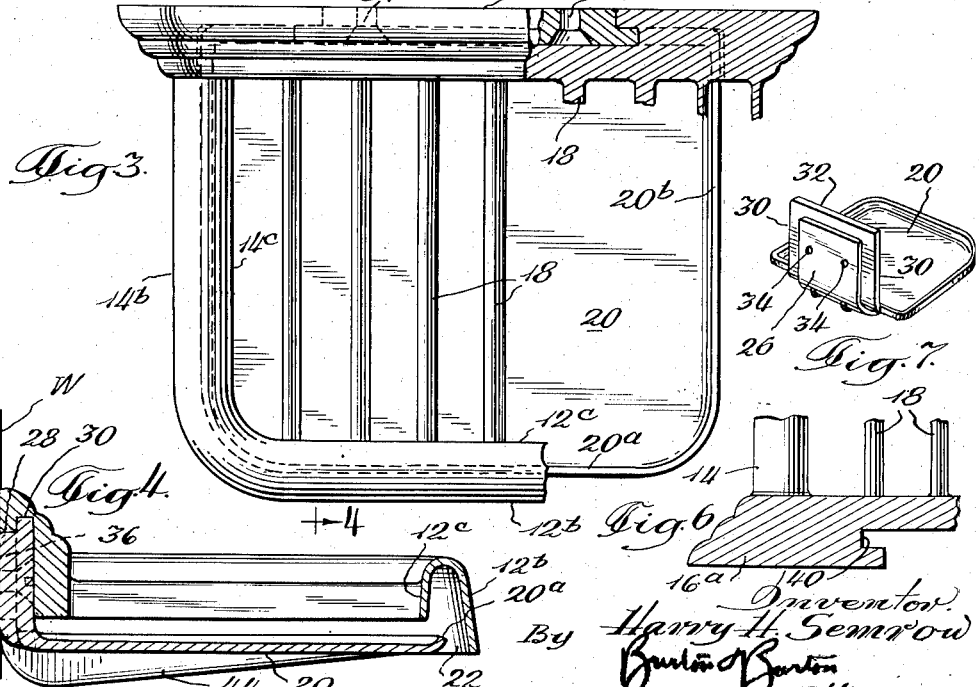
Inventor.
Harry H. Semrow
By Burton Barton
attorney Nov. 20, 1951     H. H. SEMROW     2,575,843
SOAP DISH
Filed March 14, 1946     2 SHEETS—SHEET 2
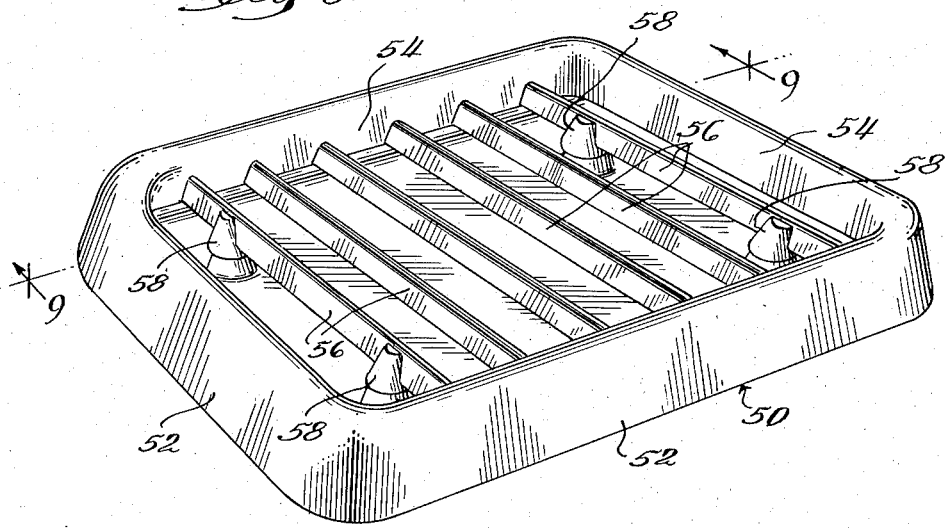
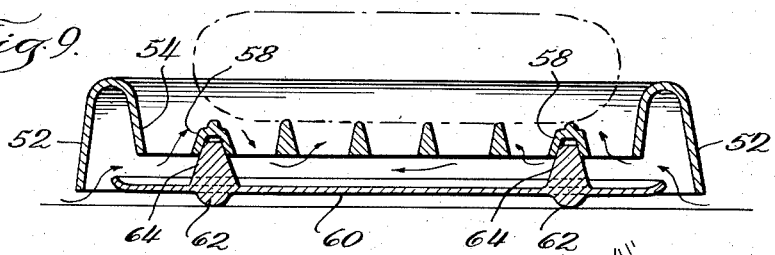
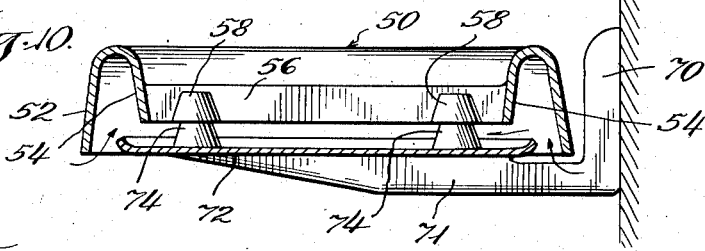
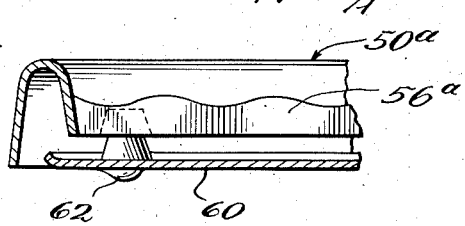

Patented Nov. 20, 1951

2,575,843

UNITED STATES PATENT OFFICE 2,575,843

SOAP DISH

Harry H. Semrow, Chicago, Ill.

Application March 14, 1946, Serial No. 654,305

7 Claims. (Cl. 45—28)

This invention relates to a dish or receptacle of the type employed to support a cake of soap and providing means for catching the drippings of liquid and soap therefrom.

One object of the invention is to provide means for thus supporting a cake of soap with a minimum of contact between the cake and the supporting elements so as to expose as much as possible of the damp area of the soap to the air to facilitate the rapid drying thereof.

Another object of the invention is to provide a soap receptacle having means adapted to continuously ventilate the under surface of a cake of soap supported therein.

It is also an object of the invention to provide a soap dish or receptacle including means for supporting it from a wall, such as the vertical wall adjacent the lavatory, and cooperating means on the receptacle itself by which it is removably positioned on the support in a manner to substantially conceal the latter so that the device, as a whole, presents an attractive and sanitary appearance.

More specifically, it is an object of the invention to provide a soap dish consisting of two parts, one of which includes a mounting bracket to be secured to a supporting wall surface, together with a drip pan to receive soapy water from a cake of soap supported in the device, the other part including a frame of attractive design, adapted to be removably mounted on the bracket and having supporting members adapted to extend above the drip pan and to support a cake of soap in that position and with most of its under surface exposed for contact with a current of air flowing between the supporting frame and the drip pan.

Other objects and advantages will appear from the following description taken in connection with the drawings, in which:

Fig. 1 is a perspective view of a soap dish embodying my invention.

Fig. 2 is a vertical sectional view taken substantially as indicated at line 2—2 on Fig. 1.

Fig. 3 is a top plan view, partly in section, and with parts broken away.

Fig. 4 is a transverse vertical section taken substantially as indicated at line 4—4 on Fig. 3.

Fig. 5 is a fragmentary rear elevation showing a portion of the supporting frame for the soap in position to be entered over the bracket by which it is to be carried.

Fig. 6 is a detail section taken as indicated at line 6—6 on Fig. 5.

Fig. 7 is a perspective view on a small scale, showing the mounting bracket and drip pan integral therewith, as seen from the rear of the bracket before it is mounted against a wall surface;

Fig. 8 is a perspective view of a modified form of the invention;

Fig. 9 is a vertical sectional view taken substantially as indicated at line 9—9 on Fig. 8;

Fig. 10 is a sectional view similar to Fig. 4 but showing another modification of the invention;

Fig. 11 is a fragmentary sectional detail view taken at the same plane as Fig. 10 but showing a modified form of soap supporting bar.

A common objection to the use of soap in the cake form is that after use the cake of soap is left with a damp and softened surface, so that if it is placed upon a flat supporting surface, or one which comes in contact with most of the under face of the cake of soap, the latter will dry very slowly, and a considerable portion of the softened soap on the surface of the cake will adhere to the supporting surface and will be wasted. Various attempts have been made to design a receptacle adapted to support a cake of soap in such a manner and in such a position that it will dry readily and without substantial loss. The present invention presents a solution of the problem.

As shown in Fig. 1, the soap dish or receptacle includes a frame member 10 having a front wall 12, side walls 14, 14 and a back wall or panel 16 which is preferably of a somewhat ornamental character. Soap supporting bars 18 extend between the front wall 12 and the back wall 16, leaving rectangular openings of substantial width between them and between the side walls 14 and the adjacent bars 18. In the particular design illustrated the side walls 14 are of hollow formation, being in the nature of downwardly open channels having curved web portions 14ª at the top, with depending outer flanges 14ᵇ, and inner flanges 14ᶜ. The inner flanges 14ᶜ are shorter than the outer flanges 14ᵇ, and the bars 18 extend downwardly only to the plane of the lower edges of said flanges 14ᶜ.

This provides a space for the accommodation of the drip pan 20 in a position in which it is concealed by the outer and longer flanges 14ᵇ and by the outer flange 12ᵇ of the front wall 12. Said front wall is also of downwardly open channel shape, as shown in Fig. 4, having a shorter inner flange 12ᶜ which terminates downwardly at the same plane as the bars 18. The lower edge 16ᶜ of the back panel is also in this plane. The front edge 20ª of the drip pan 20 is spaced back from the depending skirt or flange 12ᵇ of the front wall, providing an air passage, as indicated at 22 in Fig. 4; and the lateral edges 20ᵇ of the drip pan are spaced from the depending flanges or skirt portions 14ᵇ so as to provide air spaces 24, 24, as seen in Fig. 2.

The drip pan 20 is formed with slightly upturned edges at both sides and along the front, but its upper surface is spaced at a substantial distance below the depending inner flanges 14ᶜ of the side walls and 12ᶜ of the front wall, thus providing for access of air clear across the drip pan and under the bars 18 which are to support the cake of soap. Thus the air entering through either of the spaces 24 may flow without obstruction across the entire width of the device and out by way of the other spaces 24, a portion of the air being baffled to some extent by the bars 18 and caused to travel in the spaces between these bars so as to come into actual contact with the under surface of a soap cake resting thereon. And since a cake of soap will never occupy the entire horizontal area bounded by the wall portions 12ᶜ, 14ᶜ and 16, some of the air entering at 24 or at 22 will flow upwardly between the bars and around the soap cake after substantial contact with its moist under surface. Thus, by reason of the ventilated construction resulting from the relative dimensions and spacing of the soap supporting frame and the drip pan, a cake of soap resting on the bars 18 will dry readily, and will leave a minimum portion of its softened surface material adhering to the bars, while any excess of water draining from the cake of soap will be caught on the pan 20 and readily evaporated therefrom. Preferably, the bars 18 are of upwardly tapering cross-section, as seen in Fig. 2, so as to present relatively small areas at their upper edges for contact with the cake of soap.

The drip pan 20 is made integral with a back plate 26 having an edge rabbeted on three sides, or otherwise undercut so that when the rear surface of the plate 26 is secured against a vertical supporting wall, such as that indicated at W in Fig. 4, a groove is formed, as at 28, between the wall and the flanges 30 and 32, projecting from the sides and upper edge respectively of the back plate 26. The rear face of the back panel 16 is under-cut at 40 and 42, as indicated in Fig. 5, so that when the frame member is entered downwardly over the back plate 26 the grooves 40, under-cut in the panel 16, will fit over the flanges 30 and the groove 42 will fit over the flange 32, while the rear surface 16ᵃ of the panel 16 will fit snugly against the wall W. The back plate 26 is formed with countersunk holes 34, 34 to receive mounting screws, as indicated at 36 in Fig. 4.

With this arrangement the drip pan 20 is secured permanently by its back plate 26 to the supporting wall W, but the frame on which the soap is supported is removable at will to facilitate cleaning the drip plate and the bars 18 and other parts of the frame, thus permitting the fixture to be easily kept in attractive and sanitary condition.

The structure, as shown and described herein, may be made of sheet metal, preferably by die casting, or may be made of any of several synthetic plastic materials now available, such as those commerically known as "Catalin" or "Lucite." If desired, the drip pan 20 may be reinforced by means of tapered ribs 44 formed integrally on its under surface so that it will readily resist any pressure applied in the cleaning process. The open frame which supports the soap is a relatively rigid structure, amply capable of supporting the weight of the soap cake or resisting any pressure applied in cleaning it, without removal from the back plate, but, preferably, in most cases, it will be removed for this purpose, as already described.

Figures 8 and 9 illustrate a modified form of the invention embodying the same principles of construction which insure thorough ventilation of the soap cake but in which the device is not anchored to a wall but is designed to rest upon a horizontal supporting surface. The peripheral frame 50 is of the downwardly open channel form with outer walls or skirt flanges 52 and inner walls 54. The soap supporting bars 56 are integral with the inner walls 54 and terminate downwardly at the same plane as these walls.

The drip pan 60 is formed with downwardly projecting bosses 62 which serve as feet on which the device rests and upwardly projecting conical bosses 64 which fit into downwardly open sockets 58 formed in certain of the bars 56, as clearly shown in Fig. 6. This permits the upper frame 50 to be readily removed from the drip pan 60 for cleaning, and when the parts are assembled it insures adequate spacing between the edges of the pan 60 and the lower edges of the flanges 52 and 54 of the frame so that the flow of air through the structure and under the bars 56 is substantially unobstructed and unimpaired.

Figure 10 shows another modification in which a wall bracket 70 includes horizontally extending arms 71 which support a drip pan 72 having conical bosses 74 upstanding therefrom. The remainder of the structure is like that of Figs. 8 and 9 and comprises a frame 50 of downwardly open channel form having outer flanges 52 and inner flanges 54 with soap supporting bars 56 extending between two opposite flanges 54, 54. These bars include downwardly open sockets 58 which fit into the bosses 74 and support the frame and bars 56 in spaced relation to the pan 72 so that free access of air is afforded at all four sides of the structure.

Figure 11 shows a fragment of a frame 50ᵃ which may be of downwardly open channel form similar to the frame 50 of Fig. 8 but in which the soap supporting bars 56ᵃ are made with sinuous upper edges so as to have interrupted lines of contact with the bar of soap instead of touching it along continuous lines. This will provide for additional access of air to the under surface of the soap to insure that it shall dry readily.

In all the forms of the inventions herein disclosed it will be apparent that substantial economy is effected by preventing the waste of the soap which otherwise occurs when it is allowed to remain in a soft or pasty condition on a broad supporting surface. It also will be evident that devices embodying the invention will be sanitary to a high degree because they prevent the accumulation of pasty masses of soap which might otherwise stagnate and encourage the growth of bacteria and because they can be readily cleaned. This, added to the fact that the soap itself will dry quickly after use so that it will not be unattractive for further use, will measurably enhance the generally sanitary and clean appearance of the device.

While there is shown and described herein certain specific structure embodying the invention and illustrative thereof, it may be understood that the invention is not limited thereto or thereby, but includes all modifications and alternative forms which may occur to those skilled in the

I claim:

1. A multi-part soap dish comprising a peripheral frame with spaced horizontal bars extending between opposite sides thereof, a separate, relatively shallow drip pan secured within said frame below said bars and spaced vertically therefrom with at least the edges of said pan spaced inwardly from said frame forming passages for the flow of air through the space between the bars and said pan, and means to support said frame and pan with said passages unobstructed.

2. A soap dish as defined in claim 1, in which said frame encloses said drip pan and includes a skirt portion depending around the edges of the pan in spaced relation thereto and extending substantially to the plane of the bottom of said pan.

3. A soap dish as defined in claim 1, in which said frame is of inverted channel shape in cross-section, with the inner flange of the channel supporting said bars and disposed in approximately vertical planes inside the edges of the drip pan but terminating downwardly in spaced relation to the pan, the outer flange of the channel being disposed in approximately vertical planes outside the edges of said pan and spaced therefrom to provide the said air passages.

4. A two-part soap dish comprising a drip pan and a back plate extending upwardly therefrom for attachment to a supporting wall, together with a separate peripheral frame with spaced horizontal bars connecting opposite sides thereof, one side of said frame being shaped to engage the back plate with said bars spaced vertically from the drip pan and at least two opposite edges of said pan spaced inwardly from the outer edge of said frame forming an unobstructed passage for the flow of air between said bars and the pan.

5. In a soap dish as defined in claim 4, said side of the frame which is engaged by the back plate being formed to cover and conceal said back plate when so engaged therewith.

6. A two-part soap dish comprising a drip pan and a back plate extending upwardly therefrom for attachment to a supporting wall, together with a separate peripheral frame with spaced horizontal bars connecting opposite sides thereof, one side of said frame being shaped to engage the back plate with said bars spaced vertically from the drip pan and at least two opposite edges of said pan spaced inwardly from the outer edge of said frame forming an unobstructed passage for the flow of air between said bars and the pan, said back plate having rabbeted vertical edges and said side of the frame having correspondingly grooved portions to engage said edges, said back plate having an upwardly facing shoulder and said side of the frame having a downwardly facing abutment surface to engage said shoulder, whereby the frame is slidably removable upwardly from said back plate when the latter is secured to a vertical supporting surface.

7. A soap dish comprising a drip pan and a back plate extending upwardly therefrom and adapted for attachment to a supporting wall, together with a peripheral frame, removably engaged with and supported by said back plate, said frame having spaced horizontal bars connecting opposite sides thereof, said bars being spaced vertically from the drip pan and at least two opposite edges of said pan being spaced inwardly from said frame to provide an unobstructed passage for the flow of air between said bars and the pan, said frame and back plate having slidably interengageable portions, disengageable by upward movement of the frame with respect to said back plate whereby the drip pan is conveniently exposed for cleaning, said frame overlying and concealing said back plate, when the two are engaged together.

HARRY H. SEMROW.

REFERENCES CITED

The following references are of record in the file of this patent:

UNITED STATES PATENTS

| Number | Name | Date |
| --- | --- | --- |
| 358,766 | Albro | Mar. 1, 1887 |
| 1,198,184 | Bonnabeau | Sept. 12, 1916 |
| 1,301,720 | Long | Apr. 22, 1919 |
| 1,337,852 | Szuba | Apr. 20, 1920 |
| 2,230,709 | Walters | Feb. 4, 1941 |
| 2,359,797 | Schnider | Oct. 10, 1944 |
| 2,489,543 | Sanford | Nov. 29, 1949 |